United States Patent
Nguyen

(10) Patent No.: US 7,479,295 B2
(45) Date of Patent: Jan. 20, 2009

(54) GRAVITY BIASED GRILL WIRES

(75) Inventor: Nhiem Viet Nguyen, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 1136 days.

(21) Appl. No.: 10/765,670

(22) Filed: Jan. 27, 2004

(65) Prior Publication Data

US 2004/0182253 A1    Sep. 23, 2004

Related U.S. Application Data

(62) Division of application No. 10/185,649, filed on Jun. 28, 2002, now Pat. No. 6,708,602.

(51) Int. Cl.
*A47J 37/08* (2006.01)
(52) U.S. Cl. .................................. 426/468; 426/523
(58) Field of Classification Search ............. 426/466, 426/468, 523; 99/389, 329 P, 385, 391
See application file for complete search history.

(56) References Cited

U.S. PATENT DOCUMENTS

| | | | |
|---|---|---|---|
| 1,893,989 A | 1/1933 | Galer | |
| 1,926,276 A | 9/1933 | Forbes | |
| 1,939,247 A * | 12/1933 | Avery et al. | 99/327 |
| 1,948,739 A | 2/1934 | Wolcott et al. | |
| 1,963,409 A | 6/1934 | Johnson | |
| 1,967,209 A | 7/1934 | Lawrence | |
| 1,979,845 A | 11/1934 | Schallis | |
| 2,387,817 A * | 10/1945 | Wales | 99/327 |
| 2,491,829 A | 12/1949 | Palmer et al. | |
| 2,515,866 A | 7/1950 | Fitzgerald | |
| 2,538,650 A | 1/1951 | Palmer | |
| 2,566,904 A | 9/1951 | Palmer | |
| 2,631,523 A | 3/1953 | Olving | |
| 2,764,081 A | 9/1956 | Glasser | |
| 2,835,192 A | 5/1958 | Sivacek | |
| 2,847,931 A | 8/1958 | Saint | |
| 2,862,441 A | 12/1958 | Schmall | |
| 2,877,702 A | 3/1959 | Turner | |

(Continued)

FOREIGN PATENT DOCUMENTS

EP    0276089 A1    7/1988

(Continued)

*Primary Examiner*—Drew E Becker
(74) *Attorney, Agent, or Firm*—Panitch Schwarze Belisario & Nadel LLP

(57) ABSTRACT

A toaster including a housing with a toasting compartment, a heater located in the housing, a food cage movably supported in the toasting compartment for movement between a gripping position and a receiving position and a carriage movably supported in the housing. The carriage is permitted movement between a toasting position adjacent a lower portion of the toasting compartment and a loading position adjacent an upper portion of the toasting compartment. The carriage may receive and support a food item to be toasted in the loading position. The food cage is positioned in the receiving position when the carriage is positioned in the loading position and is positioned in the gripping position when the carriage is positioned in the toasting position. The food cage is urged toward the gripping position by gravitational forces as the carriage moves toward the toasting position.

3 Claims, 4 Drawing Sheets

U.S. PATENT DOCUMENTS

| | | | |
|---|---|---|---|
| 2,913,976 A | 11/1959 | Cole | |
| 3,361,053 A | 1/1968 | Jepson et al. | |
| 3,585,365 A | 6/1971 | Kircher | |
| 3,636,858 A | 1/1972 | Paaskesen | |
| 3,694,623 A | 9/1972 | Toyooka et al. | |
| 3,866,525 A | 2/1975 | Oxel | |
| 3,869,970 A * | 3/1975 | Eagle | 99/329 R |
| 3,915,309 A | 10/1975 | Brazdo | |
| 3,986,444 A | 10/1976 | Caudron | |
| 4,216,372 A | 8/1980 | Huggler | |
| 4,345,513 A | 8/1982 | Holt | |
| 4,396,825 A | 8/1983 | Cox et al. | |
| 4,404,899 A | 9/1983 | Weiss | |
| 4,454,803 A | 6/1984 | Wolf et al. | |
| 4,487,115 A | 12/1984 | Su | |
| 4,491,066 A | 1/1985 | Juriga et al. | |
| 4,503,758 A | 3/1985 | Carville | |
| 4,510,376 A | 4/1985 | Schneider | |
| 4,590,849 A | 5/1986 | Uemura et al. | |
| 4,656,927 A * | 4/1987 | Mosby et al. | 99/388 |
| 4,972,768 A | 11/1990 | Basora San Juan | |
| 5,121,678 A | 6/1992 | Del Fresno | |
| 5,156,637 A | 10/1992 | Wai-Ching | |
| 5,193,439 A | 3/1993 | Finesman et al. | |
| 5,265,521 A | 11/1993 | Belknap | |
| 5,385,082 A | 1/1995 | Huggler et al. | |
| 5,487,328 A | 1/1996 | Fujii | |
| 5,522,306 A | 6/1996 | DeMars | |
| 5,528,980 A | 6/1996 | McClean | |
| 5,598,765 A | 2/1997 | Yip | |
| 5,642,657 A | 7/1997 | Yeung et al. | |
| 5,644,974 A | 7/1997 | Slavin | |
| 5,647,270 A | 7/1997 | Rousseau et al. | |
| 5,653,158 A | 8/1997 | Balandier et al. | |
| 5,664,481 A | 9/1997 | Huggler | |
| 5,664,483 A | 9/1997 | Yip | |
| 5,692,432 A | 12/1997 | Hazan et al. | |
| 5,802,957 A | 9/1998 | Wanat et al. | |
| 5,924,355 A | 7/1999 | Belknap et al. | |
| 5,947,006 A | 9/1999 | Mauffrey | |
| 6,104,001 A | 8/2000 | Huggler | |
| 6,105,486 A | 8/2000 | Belknap et al. | |
| 6,112,648 A * | 9/2000 | Origane | 99/388 |
| 6,116,149 A | 9/2000 | Benedictos et al. | |
| 6,240,834 B1 | 6/2001 | Chen et al. | |
| 6,341,554 B2 | 1/2002 | Thiriat | |
| 6,429,407 B1 | 8/2002 | Garber et al. | |
| 6,431,057 B1 * | 8/2002 | Leung et al. | 99/326 |
| 6,559,423 B2 * | 5/2003 | Nguyen et al. | 219/386 |
| 6,708,602 B2 * | 3/2004 | Nguyen | 99/389 |

FOREIGN PATENT DOCUMENTS

GB      1573012      8/1980

* cited by examiner

GRAVITY BIASED GRILL WIRES

CROSS-REFERENCE TO RELATED APPLICATIONS

This patent application is a division of U.S. patent application Ser. No. 10/185,649, filed Jun. 28, 2002, now U.S. Pat. No. 6,708,602.

BACKGROUND OF THE INVENTION

The present invention is directed to toasters and, more particularly, to Gravity Biased Grill Wires for a toaster, which can be used to grip and center a food item within a toasting compartment of a toaster.

The general concept of toasters having food cages that grip and center food items in a toasting position is commonly used to hold a food item within a toasting compartment such that either side of the food item is heated or toasted evenly. Even toasting of either side of a food item is desirable and can be accomplished by gripping and centering the food item between heating elements of the toaster that are each heated to a predetermined temperature.

It is generally well known to grip and center a food item using a food cage within a toasting compartment of a toaster by actuating the food cage to grip the food item when a carriage contacts a lever of the food cage. In a common configuration, a food carriage, which supports the food item to be toasted, travels toward a toasting position adjacent a base of the toaster and contacts a lever attached to the food cage. Contact between the carriage and the lever mechanically actuates the food cage to grip the food item or actuates a spring to urge the food cage toward a gripping position. The food cage generally attempts to position the food item within the toasting compartment such that sides of the food item are an equal distance from the heating elements. The food cage gripping mechanisms are generally comprised of either mechanical contacts between the food carriage and the food cage and/or spring loaded actuators that urge the food cage toward the gripping position.

For several reasons, prior art food cages for gripping and centering food items may be complicated and unreliable. Initially, spring actuated gripping food cages have a tendency to wear and become less effective with age. Such a phenomenon can be exaggerated when the spring is used in high temperature applications adjacent toasting compartments of a toaster. In addition, the inherent hysteresis effect of mechanical springs tends to degrade the spring constant of a spring and spring performance. In addition, mechanical levers that actuate gripping of a food item through contact with a food cage may fail due to an overload placed upon the lever by inserting an oversized food item into the food cage. The extreme temperatures of a toasting compartment may also exaggerate the stresses and fatigue response of the mechanical food cage grippers.

The Gravity Biased Grill Wires of the present invention are designed to overcome the limitations of prior art food grippers. Specifically, the Gravity Biased Grill Wires are comprised of food cages that grip and center a food item within a toasting compartment without the use of mechanical contact between a carriage and the food cages and without the use of springs or other biasing elements that urge the food cages toward a gripping position. Accordingly, the mechanical failures seen in the prior art food gripping cages are generally not encountered with the Gravity Biased Grill Wires. Specifically, the Gravity Biased Grill Wires utilize the weight of the food item and/or the food cages themselves to urge the food cages toward a gripping position and to center the food item within a toasting compartment. Therefore, the Gravity Biased Grill Wires eliminate springs that have properties that degrade and mechanical levers, which may encounter extreme load failures and/or fatigue failures if oversized food items are positioned within the food cage.

BRIEF SUMMARY OF THE INVENTION

Briefly stated, the present invention is directed to a toaster for toasting foodstuffs. The toaster is comprised of a housing including a toasting compartment and a heater located within the housing. A food cage is movably supported in the toasting compartment for movement between a gripping position and a receiving position. A carriage is movably supported in the housing for movement between a toasting position adjacent a lower portion of the toasting compartment and a loading position adjacent an upper portion of the toasting compartment. The carriage is configured to receive and support a food item to be toasted in a loading position. The food cage is positioned in the receiving position when the carriage is positioned in the loading position and is positioned in the gripping position when the carriage is positioned in the toasting position. The food cage is urged toward the gripping position by gravitational forces exerted by the food cage itself and the food item as the food item on the carriage moves toward the toasting position.

In another aspect, the present invention is directed to a method of gripping and centering a food item in a toasting compartment of a toaster. A method of gripping and centering the food item of the Gravity Biased Grill Wires includes the initial step of inserting the food item onto a carriage that is positioned in a receiving position in the toasting compartment. The carriage is then urged toward a toasting position where the food item is deposited onto a food cage such that gravitational forces exerted by the food item urge the food cage to grip and center the food item within the toasting compartment.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

The present invention will hereinafter be described in conjunction with the appended drawing figures, wherein like numerals denote like elements, and:

In the drawings:

FIG. 1 is a right-side perspective view of a toaster with the housing cut away, a food cage and a carriage with a second food cage and carriage removed from the toaster in accordance with a preferred embodiment of the present invention;

FIG. 2 is a right-side perspective view of the food cage, carriage and an end wall of the toaster shown in FIG. 1;

FIG. 3 is a top plan view of the carriage, food cage and end wall of the toaster shown in FIG. 2;

FIG. 4 is a front elevation view of the food cage, carriage and end wall of the toaster shown in FIG. 2, in a loading and receiving position; and FIG. 5 is a front elevation view of the food cage, carriage and end wall of the toaster shown in FIG. 2, in a gripping and toasting position.

DETAILED DESCRIPTION OF THE INVENTION

Figure 1:
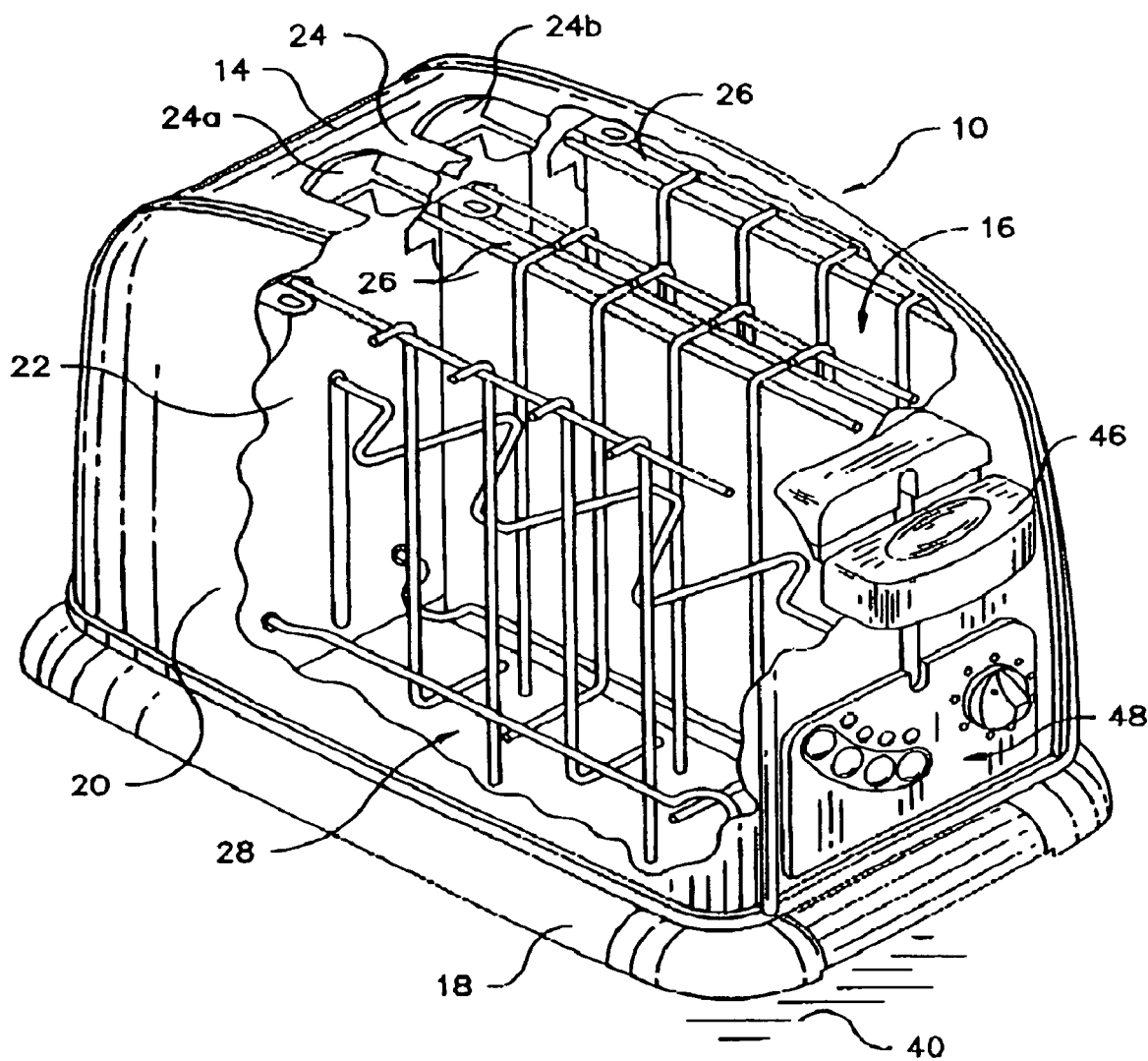

Referring to the drawings in detail, wherein like numerals indicate like elements throughout, there is shown in FIGS. 1-5, a preferred embodiment of a toaster, generally designated 10, for toasting a food item 12 (see FIG. 5), such as a slice of bread, in accordance with a preferred embodiment of the present invention.

Referring to FIG. 1, the toaster 10 includes a housing 14 with a heating or toasting compartment 16. In the preferred embodiment, the housing 14 includes a base 18, side walls 20, a pair of end walls 22 and a top cover 24 including at least a bread slot 24a. The cover 24 may include a single bread slot 24a, a pair of bread slots 24a, 24b, as shown in FIG. 1, or any number of bread slots desired by a user, depending upon the capacity of the specific toaster 10. It is preferred that the housing 14 be constructed of resilient, rigid metallic sheet material. A heater 26 is located within the housing 14 for heating the toasting compartment 16. It is preferred that the heater 26 be constructed of an electric resistance type heater for heating the toasting compartment 16, however, one skilled in the art will realize that the heater 26 is not so limited and may be comprised of any device that heats the toasting compartment 16 and food item 12 to a preferred toasting temperature.

Figure 2:
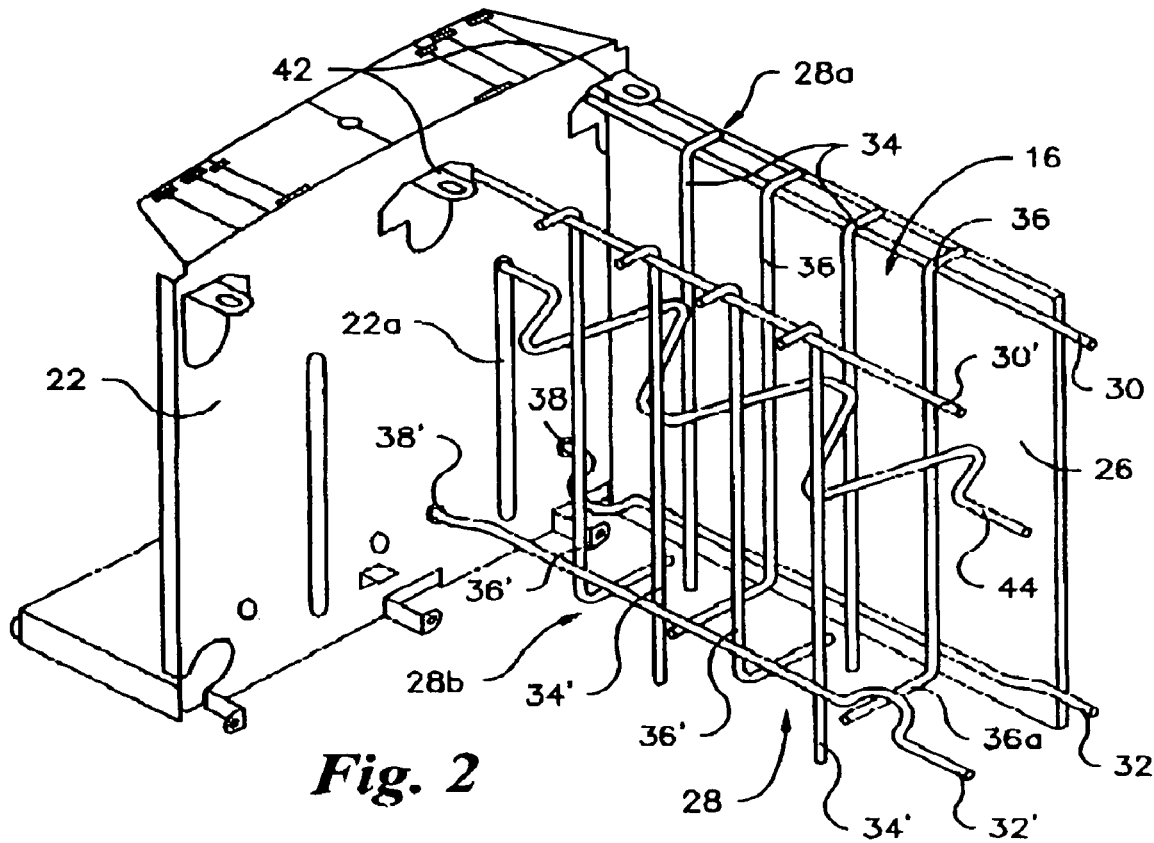
Figure 4:
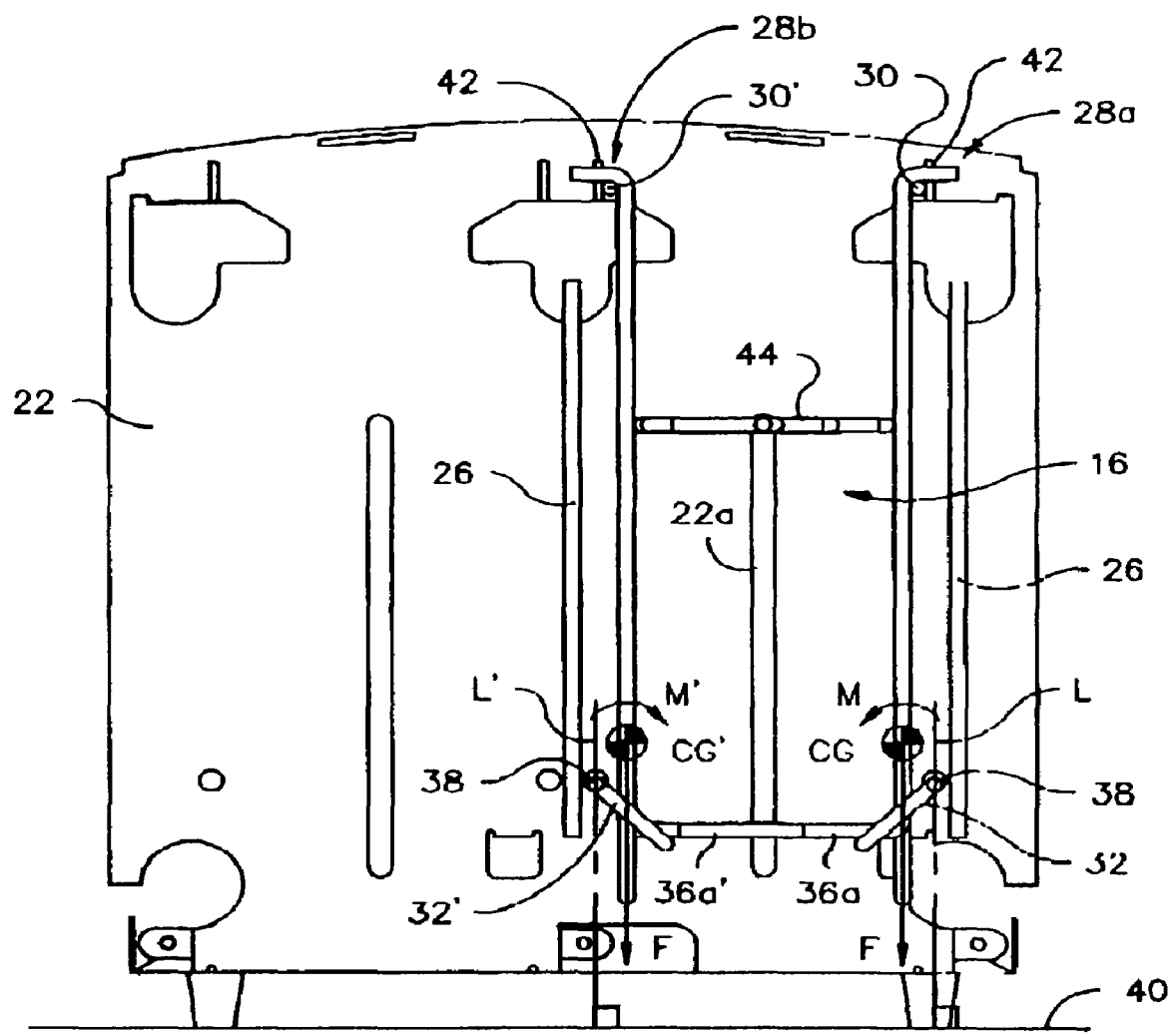

Referring to FIG. 2, the toaster 10 further includes a food cage 28 supported in the toasting compartment 16 for movement between a gripping position (see FIG. 5) and a receiving position (see FIG. 4). The food cage 28 is comprised of a first food cage assembly 28a and a second food cage assembly 28b. The food cage assemblies 28a, 28b are each comprised of an upper support rod 30, 30', a lower support rod 32, 32', at least one L-shaped support wire 34, 34' and at least one Z-shaped support wire 36, 36'. The rods 30, 30', 32, 32' and wires 34, 34', 36, 36' are preferably constructed from galvanized wire or chrome coated steel. However, the rods 30, 30', 32, 32' and wires 34, 34', 36, 36' are not limited to galvanized wire and chrome coated steel constructions and may be manufactured from any generally stiff, resilient material that can take on the shape of the rods 30, 30', 32, 32' and wires 34, 34', 36, 36' and operate in the relatively high temperature environment of the toasting compartment 16. For example, the rods 30, 30', 32, 32' and wires 34, 34', 36, 36' may be constructed of a stainless steel material. The upper support rods 30, 30' and lower support rods 32, 32' are positioned generally parallel to a support surface 40 of the toaster 10 and the L-shaped support wires 34, 34' and Z-shaped support wires 36, 36' are positioned generally perpendicular to the support surface 40. The L-shaped and Z-shaped support wires 34, 34', 36, 36' are secured to the upper and lower support rods 30, 30', 32, 32'.

In the preferred embodiment, the L-shaped and Z-shaped support wires 34, 34', 36, 36' are spot welded to the upper and lower support rods 30, 30', 32, 32', as shown in the attached figures. However, one having ordinary skill in the art will realize that securing the upper and lower support rods 30, 30', 32, 32' to the L-shaped and Z-shaped support wires 34, 34', 36, 36' is not limited to spot welding and may include any attachment method that holds the upper and lower support rods 30, 30', 32, 32' relative to the L-shaped and Z-shaped support wires 34, 34', 36, 36' in a predetermined position. For example, the L-shaped and Z-shaped support wires 34, 34', 36, 36' may be adhesively bonded, mechanically clamped or mechanically fastened to the upper and lower support rods 30, 30', 32, 32'.

The food cage 28 is pivotally supported by the end walls 22 at pivot points 38, 38' adjacent the base 18. In the preferred embodiment, the pivot points 38, 38' are comprised of circular penetrations drilled into the end walls 22. The ends of the lower support rods 32, 32' rest in the pivot points 38, 38' and are able to rotate about the pivot points 38, 38' due to the generally circularly-shaped cross section of the lower support rods 32, 32' and the generally circular shape of the pivot points 38, 38'. The lower support rods 32, 32' rotatably support the food cage 28 within the toasting compartment 16 at the pivot points 38, 38'. The pivot points 38, 38' are not limited to simple circular drilled penetrations located adjacent the base 18 but may take on nearly any shape, size and location that accommodates support and pivotal movement of the food cage 28 about the pivot points 38, 38'. For example, the pivot points 38, 38' may be comprised of generally square penetrations that accept generally square bearing housings, which support and allow pivotal movement of the food cage 28. In addition, the pivot points 38, 38' may be located nearly anywhere on the end walls 22, base 18 or housing 14 that permits support and pivotal movement of the food cage 28.

Referring to FIGS. 2-5, the toaster 10 further includes a carriage 44 movably supported in the housing 14 for movement between a toasting position (see FIG. 5) and a loading position (see FIGS. 2 and 4). In the toasting position, the carriage 44 is positioned adjacent the base 18 while in the loading position, the carriage 44 is positioned closer to one of the bread slots 24a, 24b. When the carriage 44 is in the toasting position, first ends 36a, 36a' of the Z-shaped support wires 36, 36' extend into the toasting compartment 16 and support the food item 12. In the preferred embodiment, the carriage 44 has a generally sine-wave shape permitting the carriage 44 to travel through the toasting compartment 16 without contacting the first ends 36a, 36a' of the Z-shaped support wires 36, 36' that extend into the toasting compartment 16. One having ordinary skill in the art will recognize that the carriage 44 is not limited to the sine-wave shape and may be comprised of any shape that permits the carriage 44 to travel between the toasting position and the loading position without coming into contact with the first ends 36a, 36a' of the Z-shaped support wires 36, 36'. For example, the carriage 44 may have a square-wave shape, triangular-wave shape, serpentine shape or any other shape that permits the carriage 44 to travel between the toasting position and the loading position without coming into contact with the first ends 36a, 36a' of the Z-shaped support wires 36, 36'.

Figure 5:
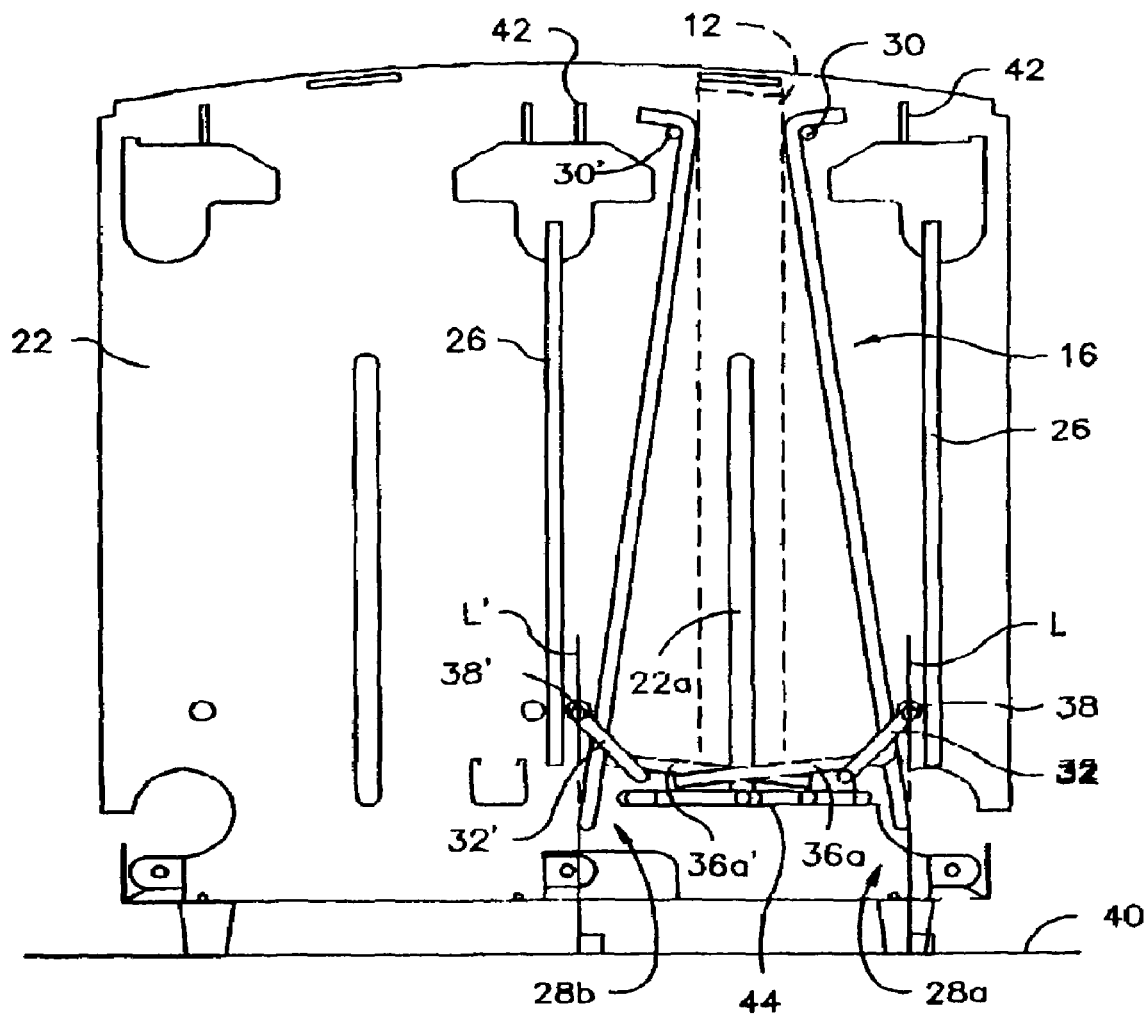

Referring to FIGS. 2, 4 and 5, when the food cage 28 is positioned in the receiving position, the carriage 44 is positioned in the loading position (see FIG. 4) and the food cage 28 is positioned in the gripping position when the carriage 44 is positioned in the toasting position. The carriage 44 is generally biased toward the loading position and is accommodated in its movement between the loading position and the toasting position, at least partially, by a guide slot 22a in at least one of the end walls 22. In the preferred embodiment, as the carriage 44 moves toward the loading position accommodated by the guide slot 22a, contact between contact surfaces of the carriage 44 and the food cage 28 cause the food cage 28 to move toward the receiving position. Specifically, peaks of the sine-wave shaped carriage 44 contact the L-shaped support wires 34, 34' of the food cage 28 causing the food cage 28 to move toward the receiving position. Accordingly, in the preferred embodiment, the distance between the upper support rods 30, 30' will generally be at least as wide as a peakto-peak width of the sine-wave shaped carriage 44. It is preferred that the distance between the upper support rods 30, 30', in the loading position, is no wider than the peak-to-peak width of the carriage 44 such that a food item that is wider than the peak-to-peak width of the carriage 44 may not be easily wedged into the food cage 28 and supported by the carriage 44.

Referring to FIG. 5, when the carriage 44 is positioned in the toasting position, the food cage 28 supports the food item 12 above the carriage 44 in the toasting compartment 16. In addition, in the gripping position, the food cage 28 is inhibited from over rotation by contact between the support wires 34, 34', 36, 36' and the food item 12 positioned within the toasting compartment 16.

Referring to FIGS. 2, 4 and 5, ends of the lower support rods 32, 32' extend through the pivot points 38, 38' such that centers of gravity CG, CG' of the first and second food cage assemblies 28a, 28b are offset toward a center of the toasting compartment 16 from a plane defined by the pivot points 38, 38' and a line L, L' extending perpendicularly between the support surface 40 and an individual pivot point 38, 38'. This configuration of the centers of gravity CG, CG' of the food cage assemblies 28a, 28b, biases the food cage assemblies 28a, 28b toward a gripping position. One skilled in the art will realize that the lower support rods 32, 32' are not limited to supporting the first and second food cage assemblies 28a, 28b and the first and second food cage assemblies 28a, 28b may be gravitationally biased toward a gripping position by positioning their centers of gravity CG, CG' toward a center of the toasting compartment 16 when compared to any rotatable support point. For example, rotational supports may extend from the base 18 of the housing 14 to grip the lower support rods 32, 32' at a plane outward from the centers of gravity CG, CG' of the first and second food cage assemblies 28a, 28b. In addition, one skilled in the art will realize that the centers of gravity CG, CG' of the first and second food cage assemblies 28a, 28b may be positioned on the above-described plane or slightly offset away from the toasting compartment 16 relative to the plane. In such a configuration, only the weight of the food item 12 on the food cage 28 urges the first and second food cage assemblies 28a, 28b toward the gripping position when the carriage 44 descends to the toasting position. The key being that the food cage 28 grip and center the food item 12 when the carriage 44 is in the toasting position without the use of springs or mechanical contact between the carriage 44 and food cage 28.

Figure 3:
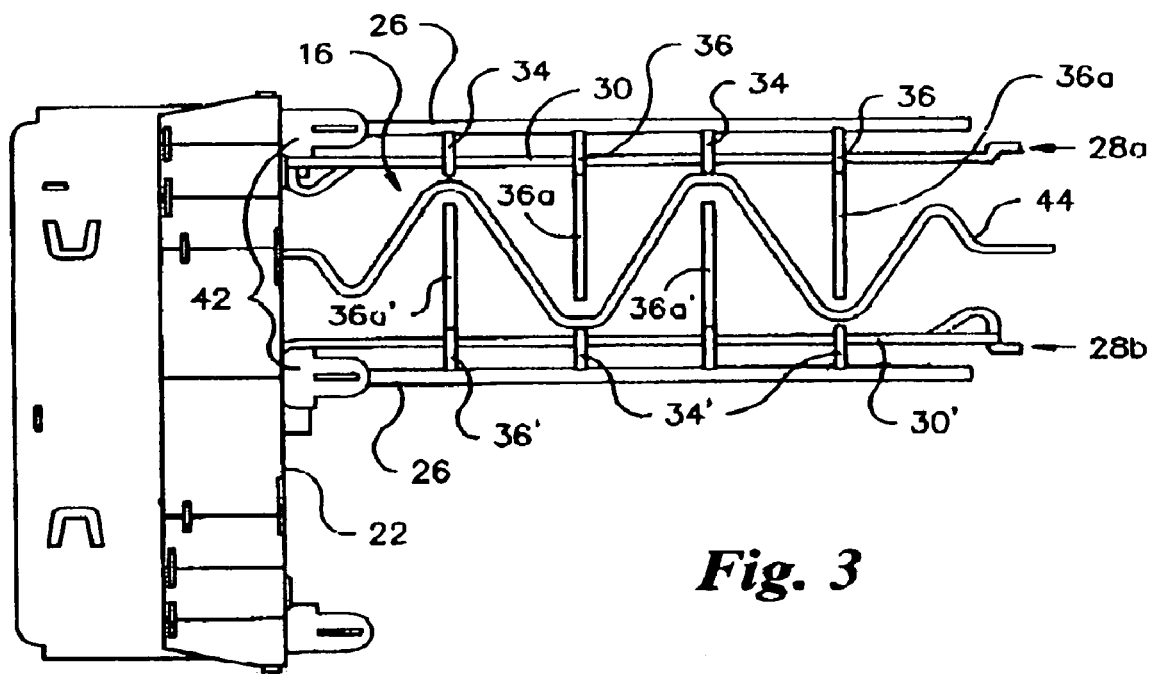

Referring to FIGS. 2 and 3, it is preferred that stoppers 42 extend generally perpendicularly from the end walls 22 and provide limits on the movement of the food cage 28 in the receiving position. The stoppers 42 provide an obstacle for over-rotation of the food cage 28 toward the heaters 26. In the preferred embodiment, the stoppers 42 are positioned relative to the end walls 22 and food cage 28 such that the upper support rods 30, 30' contact the stoppers 42 in the receiving position and block rotation of the upper support rods 30, 30' and the food cage 28 away from the toasting compartment 16 any further than the receiving position. It is preferred that the upper support rods 30, 30', L-shaped support wires 34, 34' and Z-shaped support wires 36, 36' do not rotate further than the receiving position away from the toasting compartment 16 and come into contact with an adjacent food cage 28, the heaters 26 or the side walls 20 of the housing 14. Preferably, the food cage 28 should not come into contact with the heaters 26, particularly if the heaters 26 are electrical resistance-type heaters 26 and the food cage 28 is comprised of an electrically conducting material. In the preferred embodiment, the stoppers 42 are comprised of portions framed from the end walls 22 that are bent into a position extending generally perpendicularly from the end walls 22. That is, the stoppers 42 are comprised of portions of the end walls 42 that have been framed and bent into a particular shape to facilitate contact between the stoppers 42 and upper support rods 30, 30' in the receiving position. However, the stoppers 42 are not limited to constructions including framed and bent portions of the end walls 22. For example, the stoppers 42 may be comprised of tabs that are secured to the end walls 22 and extend toward the toasting compartment 16 to contact and hold the upper support rods 30, 30' and food cage 28 in the receiving position. In addition, the stoppers 42 are not limited to their preferred location extending from the end walls 22 on either side of the food cage 28 adjacent the bread slots 24a, 24b. For example, the stoppers 42 may be secured to or extend from the base 18 to contact one of the Z-shaped support wires 36, 36', L-shaped support wires 34, 34' or the lower support rods 32, 32' in the receiving position to block rotation of the food cage 28 away from the toasting compartment 16 beyond the receiving position.

Referring to FIGS. 3 and 4, in operation, the food cage 28 is initially positioned in the receiving position when the carriage 44 is positioned in the loading position. The food cage 28 is held in the receiving position through contact between peaks of the sine-wave shaped carriage 44 and the L-shaped support wires 34, 34'. The first and second food cage assemblies 28a, 28b are prevented from an over rotation through contact between the upper support rods 30, 30' and the stoppers 42. The food item 12 is placed onto the carriage 44 between the first and second food cage assemblies 28a, 28b having at least a portion of the food item 12 positioned within the toasting compartment 16. A user then selects a toasting time or temperature at a control panel 48, using buttons or knobs that are well known in the art, and depresses an operating knob 46 to urge the carriage 44 toward the toasting position.

Referring to FIGS. 3 and 5, in the preferred embodiment, as the carriage 44 moves toward the toasting position, the food cage 28 moves toward a gripping position urged by gravitational forces acting upon the first and second food cage assemblies 28a, 28b. The gravitational forces F, F' of the individual food cage assemblies 28a, 28b act from the centers of gravity CG, CG' resulting in rotational moments M, M' acting on the individual food cage assemblies 28a, 28b, which urge a rotation toward a center of the toasting compartment 16. The moments M, M' are the result of the positioning of the pivot points 38, 38' with respect to the centers of gravity CG, CG' of the individual food cage assemblies 28a, 28b.

As the carriage 44 moves from the loading position to the toasting position the food item 12 is displaced onto the first ends 36a, 36a' of the Z-shaped support wires 36, 36'. When the carriage 44 reaches the toasting position, a base of the food item 12 contacts and is supported by the first ends 36a, 36a' of the Z-shaped support wires 36, 36' and the carriage 44 passes beyond the first ends 36a, 36a' to a position adjacent the base 18. The weight of the food item 12 upon the first and second food cage assemblies 28a, 28b and the weight of the food cages 28a, 28b themselves further urge the first and second food cage assemblies 28a, 28b toward the gripping position by causing the upper support wires 30, 30' to move toward each other. The food cage 28 fully supports the food item 12 in the gripping position when the carriage 44 is in the toasting position. In the gripping position, the food cage 28 urges the food item 12 toward a center of the toasting compartment 16 such that the heating elements 26 are generally positioned an equal distance from either side of the food item 12. Accordingly, when the carriage 44 reaches the toasting position, the heating elements 26 begin heating and toasting either side of the food item 12 relatively equally. However, one skilled in the art will realize that toasters 10 may be actuated to heat an individual heating element 26 to a greater temperature than an opposing heating element 26, thereby toasting one side of a food item 12 more than the other even when the heating elements 26 are positioned at an equal distance from each side of the food item 12. In addition, a food cage 28 and heating element 26 may be positioned such that one side of the food item 12 is positioned at a variable distance from an opposing heating element 26 to heat one side of the food item 12 more than another.

At the conclusion of a toasting cycle, the food carriage 44 is urged toward the food item 12, which is held by the food cage 28 in the gripping position. The carriage 44 contacts a bottom of the food item 12 and releases a portion of the moments M, M' urging the food cage 28 toward the gripping position as the food item 12 is lifted from the first ends 36a, 36a'. As the carriage 44 moves toward the loading position, peaks of the sine-wave shape of the carriage 44 again contact inner surfaces of the L-shaped support wires 34, 34' urging the first and second food cage assemblies 28a, 28b away from the gripping position and toward the receiving position. When the carriage 44 reaches the loading position the food item 12 is no longer gripped between the first and second food cage assemblies 28a, 28b and the food cage assemblies 28a, 28b are prevented from over rotating by the stoppers 42. A user may then remove the toasted food item 12 from the toasting compartment 16.

One having ordinary skill in the art will realize that the specific arrangement shown in FIGS. 1-5 of the food cage 28 and carriage 44 is not limited but may be comprised of any mechanical arrangement that permits support of the food item 12 by the carriage 44 in a loading position and permits the food cage 28 to grip the food item 12 in a gripping position urged by gravitational forces acting on the food cage 28 and food item 12. In addition, one having ordinary skill in the art will realize that the carriage 44 is positioned a predetermined distance below the food item 12 and first ends 36a, 36a' in the toasting position to permit movement of the carriage 44 toward the food item 12 through the predetermined distance at the conclusion of the toasting cycle. Movement of the carriage 44 through the predetermined distance permits power to be cut from the heating elements 26 even if the food item 12 becomes jammed within the toasting compartment 16. Cutting power to the heating elements 26 even when jamming of the food item 12 occurs prevents over heating or possible burning of the food item 12.

In another aspect, the present invention is directed to a method of gripping and centering the food item 12 in the toasting compartment 16 of the toaster 10. The method of gripping and centering the food item 12 in the toaster 10 includes inserting the food item 12 onto the carriage 44 that is positioned in a receiving position within the toasting compartment 16. The carriage 44, which is supporting the food item 12, is then urged toward a toasting position. The food item 12 is deposited onto the food cage 28 such that gravitational forces exerted by the food cage 28 and the food item 12 urge the food cage 28 to grip and center the food item 12 within the toasting compartment 16. The carriage 44 is positioned adjacent the base 18 of the toaster 10 in the toasting position, which actuates the heating elements 26 to energize and heat the food item 12 during a predetermined toasting cycle. At a conclusion of the toasting cycle, the carriage 44 is urged toward the food item 12 to return the food item 12 and food cage 28 to the receiving position.

It will be appreciated by those skilled in the art that changes could be made to the above-described embodiments without parting from the broad inventive concept thereof. For example, the centers of gravity CG, CG' of the first and second food cage assemblies 28a, 28b may be positioned directly in a plane with the perpendicular line L, L' from the support surface 40 to the pivot points 38, 38' or slightly offset from the lines L, L' as described above. In such an arrangement, the first and second food cage assemblies 28a, 28b may be balanced in the receiving position and urged toward the gripping position by depositing the food item 12 onto the first ends 36a, 36a' creating moments M, M' that urge the first and second food cage assemblies 28a, 28b toward the gripping position. Further, gravity biased grill wires are not limited to the preferred embodiment including both the first and a second food cage assembly 28a, 28b. A single gravity biased food cage assembly with an opposing stationary food cage assembly may grip a food item disposed into the toasting compartment 16 similar to the above-described food cage 28. While the principles of the invention have been described above in connection with a specific apparatus, it is to be clearly understood that this description is made only by way of example and not as a limitation on the scope of the invention.

I claim:

1. A method of gripping and centering a food item in a toasting compartment of a toaster comprising the steps of:
    a) inserting the food item onto a carriage that is positioned in a receiving position within the toasting compartment;
    b) urging the carriage toward a toasting position; and
    c) depositing the food item onto a food cage such that gravitational forces exerted by the food item urge the food cage to grip and center the food item within the toasting compartment.

2. The method of gripping and centering a food item in a toasting compartment of a toaster of claim 1 further comprising the step of:
    a) urging the carriage toward the food item at a conclusion of a toasting cycle to return the food item to the receiving position.

3. The method of gripping and centering a food item in a toasting compartment of a toaster of claim 1 wherein at the conclusion of step (c) the carriage is positioned adjacent a base of the toaster, which initiates a heater to energize and heat the food item during a predetermined toasting cycle.

* * * * *